United States Patent
Curran et al.

(10) Patent No.: US 10,203,106 B2
(45) Date of Patent: *Feb. 12, 2019

(54) ILLUMINATED VEST

(71) Applicant: NOXGEAR, LLC, Dayton, OH (US)

(72) Inventors: Simon Curran, Dayton, OH (US);
Thomas Walters, Dayton, OH (US)

(73) Assignee: NOXGEAR, LLC, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,628

(22) Filed: Jul. 6, 2016

(65) Prior Publication Data

US 2016/0312993 A1 Oct. 27, 2016

Related U.S. Application Data

(63) Continuation of application No. 14/024,068, filed on Sep. 11, 2013, now Pat. No. 9,410,694.
(Continued)

(51) Int. Cl.
*A41D 1/00* (2018.01)
*A41D 1/04* (2006.01)
(Continued)

(52) U.S. Cl.
CPC ............ *F21V 33/008* (2013.01); *A41D 1/002* (2013.01); *A41D 1/04* (2013.01); *F21V 23/003* (2013.01);
(Continued)

(58) Field of Classification Search
CPC .. A41D 13/01; A41D 19/0157; G02B 6/3616;
G02B 6/3664; G02B 6/3268; G02B 6/3608; G02B 6/3827; G02B 6/3826; G02B 6/3806; G02B 6/3829; G02B 6/3873; G02B 6/3887; G02B 7/002; F21V 2200/15
(Continued)

(56) References Cited

U.S. PATENT DOCUMENTS

| 4,727,603 | A | | 3/1988 | Howard |
| 5,128,843 | A | * | 7/1992 | Guritz ................. A41D 27/085 362/103 |

(Continued)

FOREIGN PATENT DOCUMENTS

WO 2011041423 A2 4/2011

OTHER PUBLICATIONS

Under Armour, Armour39™ Fitness and Tracking System, "How Strong is your Willpower™?", located at http://www.underarmour.com/shop/us/en/armour39, downloaded Jun. 19, 2013.
(Continued)

*Primary Examiner* — William N Harris
(74) *Attorney, Agent, or Firm* — Thomas E. Lees, LLC (57) ABSTRACT

An illuminated vest comprises an enclosure including a light-emitting diode and control electronics that control the light emitting diode. Coupled to the enclosure is a belt made of passive material. A limb loop is created by an optical fiber structure that includes a first end and a second end. The light-emitting diode is optically coupled to the first end of the fiber optic structure. The optical fiber structure is also independent of passive material, such that the optical fiber structure forms a structure for the vest.

13 Claims, 6 Drawing Sheets

Related U.S. Application Data (60) Provisional application No. 61/701,845, filed on Sep. 17, 2012.

(51) Int. Cl.

| | |
|---|---|
| *F21V 8/00* | (2006.01) |
| *F21V 23/00* | (2015.01) |
| *F21V 33/00* | (2006.01) |
| *H05B 33/08* | (2006.01) |
| *H05B 37/02* | (2006.01) |
| *F21Y 113/10* | (2016.01) |
| *F21Y 115/10* | (2016.01) |

(52) U.S. Cl.
CPC ........ *F21V 33/0008* (2013.01); *G02B 6/0006* (2013.01); *H05B 33/083* (2013.01); *H05B 33/0815* (2013.01); *H05B 33/0845* (2013.01); *H05B 33/0857* (2013.01); *H05B 33/0872* (2013.01); *H05B 37/0218* (2013.01); *H05B 37/0227* (2013.01); *H05B 37/0272* (2013.01); *F21V 2200/15* (2015.01); *F21Y 2113/10* (2016.08); *F21Y 2115/10* (2016.08)

(58) Field of Classification Search
USPC ........................................ 362/103, 108, 570
See application file for complete search history.

(56) References Cited

U.S. PATENT DOCUMENTS

| | | | |
|---|---|---|---|
| 5,249,106 | A | 9/1993 | Barnes et al. |
| 5,424,922 | A | 6/1995 | Wise |
| 5,630,382 | A | 5/1997 | Barbera et al. |
| 5,879,076 | A | 3/1999 | Cross |
| 5,984,488 | A | 11/1999 | Tung |
| 6,110,558 | A | 8/2000 | Billingsley et al. |
| 6,146,006 | A | 11/2000 | Cross |
| 6,153,128 | A | 11/2000 | Lightle et al. |
| 6,217,188 | B1 | 4/2001 | Wainwright et al. |
| 6,267,482 | B1 | 7/2001 | Miller et al. |
| 6,877,889 | B2 | 4/2005 | Peng et al. |
| 7,144,127 | B2 | 12/2006 | Golle et al. |
| 7,213,935 | B2 | 5/2007 | Lee |
| 7,377,663 | B2 | 5/2008 | Desjardin |
| 8,376,564 | B2 | 2/2013 | Finn |
| 8,408,731 | B1 | 4/2013 | Joyner |
| 9,560,725 | B2 * | 1/2017 | Wilson ............... H05B 33/0803 |
| 2002/0122316 | A1 | 9/2002 | Hsieh |
| 2003/0192111 | A1 | 10/2003 | Galoob |
| 2008/0043458 | A1 | 2/2008 | Desjardin |
| 2010/0184563 | A1 | 7/2010 | Molyneux et al. |
| 2011/0170193 | A1 | 7/2011 | Budd et al. |
| 2011/0297720 | A1 * | 12/2011 | Yu ............................ A45F 3/10 224/623 |
| 2012/0078393 | A1 | 3/2012 | Kotb et al. |
| 2013/0139606 | A1 | 6/2013 | Swinehart et al. |
| 2015/0062959 | A1 * | 3/2015 | Wilson ............... H05B 33/0803 362/570 |

OTHER PUBLICATIONS

Elemental LED, Halo LED Light Belt, located at http://www.elementalled.com/halo-light-belt.html, downloaded Jun. 19, 2013.
Alibaba.com, supplier Dongguan Shenghong Webbing Co. Ltd., Night Light Led Belt for Sport, located at http://www.alibaba.com/product-gs/744903324/night_light_LED_belt_for_sport.html, downloaded Jun. 20, 2013.
Road Runner Sports, Nite Beams LED Arm/Leg Bands, located at http://www.roadrunnersports.com/rrs/products/NIB102/, downloaded Jul. 23, 2013.
Nike, Inc., NIKE+ Fuelband, located at http://www.nike.com/gb/en_gb/c/nikeplus-fuelband, downloaded Jun. 26, 2013.
AsianTown.NET, Weblogs, Style & Fashion, "Fiber Optic Illuminated Clothing", located at http://blog.asiantown.net/-/684/Fiber_Optic_Illuminated_Clothing, Mar. 10, 2009.
Prlog, Press Release Distribution, "The Fiber Optics Safety Vest Lights the Way for Joggers & Bikers", LumiGram®, Light for Style, located at http://www.prlog.org/11839397-the-fiber-optics-safety-vest-lights-the-way-for-joggers-bikers.html, Apr. 2, 2012.
Alibaba.com, AliExpress, Wholesale Fiber Optic Belt-Buy Fiber Optic Belt lots from China Fiber Optics Belt Wholesale, located at http://www.aliexpress.com/wholesale/wholesale-fiber-optic-belt.html, downloaded Jul. 23, 2013.
Dan Hope, "GPS Clothing: You Wear it Where?", TechMedia Network, located at http://gps.toptenreviews.com/recreation/gps-clothing-you-wear-it-where-.htm, downloaded Jun. 26, 2013.
Nite Ize, Inc., LED Sport Vest, http://www.niteize.com/product/LED-Sport-Vest.asp, downloaded Jun. 19, 2013.
Nathan Sports, Photon LED Vest, located at http://www.nathansports.com/visibility/reflective-gear/photon-led-vest, downloaded Jun. 19, 2013.
Amphipod, Inc., Xinglet Flash LED™, located at http://www.amphipod.com/products/visibility/ledslighted-bands/xinglet-flash-led, downloaded Jun. 19, 2013.
yousawme.com, Products & Sales, "You Saw Me", located at http://yousawme.com/Product_Sales.html, downloaded Jun. 19, 2013.
RobotShop Distribution Inc., Arduino LilyPad Light Sensor—RobotShop, located at http://www.robotshop.com/arduino-lilypad-light-sensor-1.html, downloaded Jun. 26, 2011.
Petzl, NAO/Petzl, Sport, NAO, Rechargeable headlamp with self-adjusting lighting—Reactive Lighting technology, located at http://www.petzl.com/us/outdoor/headlamps/performance-series-headlamps/performance-series-headlamps-0/nao, downloaded Jun. 26, 2011.
Candle Power Fora, LLC, CPF CandlePowerForums, Blog Page, User Screen Name MikeAusC, New Petzl NAO !, p. 2, located at http://www.candlepowerforums.com/vb/showthread.php?331237-New-Petzl-NAO-!/page2, Jan. 21, 2012.
Texas Instruments Incorporated, Texas Instruments, "LM3530 High Efficiency White LED Driver with Programmable Ambient Light Sensing Capability and I2C-Compatible Interface", Jun. 2009, revised Mar. 2013.
Ada Brunstein, The Atlantic, "The Little Black Piezoelectric Dress", The Atlantic Monthly Group, located at http://www.theatlantic.com/magazine/archive/2010/06/the-little-black-piezoelectric-dress/308107/, May 11, 2010.
Kristof Van Laerhoven et al., "Multi-Sensor Context Aware Clothing (2002)", CiteSeerx, in Proceedings of the Sixth International Symposium on Wearable Computers, 2002, Abstract, The Pennsylvania State University, located at http://citeseerx.ist.psu.edu/viewdoc/summary?doi=10.1.1.19.908.
Kristof Van Laerhoven et al., "Multi-Sensor Context Aware Clothing", Ubicomp Group, Lancaster University, LA1 Lancaster 4YR, United Kingdom, 2002.
Zone Systems, Inc., Zone Laser Tag, Rift-Blaster, located at http://www.zonelasertag.com/index.php/solutions/laser-tag-systems/rift-blaster, downloaded Jun. 27, 2013.
Lasertron, Inc., Lasertron, Designers of the Best Indoor Laser Tag Experiences—The LT-12 Laser Tag Game System, located at http://www.laser-tron.com/index.php?page=lt-12, downloaded Jun. 27, 2013.
Wikipedia, Q-Zar, located at http://en.wikipedia.org/wiki/Q-Zar, downloaded Jun. 27, 2013.
Roadnoise Sports, Inc., located at http://www.roadnoise.com/products, downloaded Jul. 25, 2013.
Jawbone, UP™, Know Yourself Live Better™, located at https://jawbone.com/up, downloaded Jul. 25, 2013.

* cited by examiner

ILLUMINATED VEST

CROSS-REFERENCE TO RELATED APPLICATIONS

This application is a continuation of U.S. patent application Ser. No. 14/024,068, filed Sep. 11, 2013, entitled "ILLUMINATED VEST", now allowed, which claims the benefit of U.S. Provisional Patent Application Ser. No. 61/701,845, filed Sep. 17, 2012, entitled "ILLUMINATED VEST AND COMMUNICATION THEREWITH", the disclosures of which are hereby incorporated by reference in its entirety.

BACKGROUND

Various aspects of the present invention relate generally to athletics and specifically to safety and identification in sporting events and exercise.

People enjoy playing sports and exercising. In many instances a sport requires players to divide up into two or more teams. As such, jerseys are assigned to separate teams to distinguish one team from another, or one team may play with a shirt on, while the other team plays shirtless.

BRIEF SUMMARY

According to aspects of the present invention, an illuminated vest comprises an enclosure including a light-emitting diode and control electronics that control the light emitting diode. Coupled to the enclosure is a belt made of passive material. A limb loop is created by an optical fiber structure that includes a first end and a second end. The light-emitting diode is optically coupled to the first end of the fiber optic structure. The optical fiber structure is also independent of passive material, such that the optical fiber structure forms a structure for the vest.

According to further aspects of the invention, a system includes the vest described above with a wireless transceiver and a zone marker with a wireless transceiver communicably coupled to the wireless transceiver of the vest. The zone marker sends information to the vest via the wireless transceiver, and a controller of the vest controls the light-emitting diode based on the information.

DETAILED DESCRIPTION

According to various aspects of the present disclosure, an illuminated vest includes an enclosure, a belt, and an optical fiber structure, which includes a side-emitting optical fiber. A light-emitting diode ("LED") drives the optical fiber structure, which emits the light throughout the optical fiber. For example, if a green LED drives the optical fiber structure, then the vest will illuminate a green light. If the LED is pulsed, then the vest will pulse light.

The optical fiber structure is independent of passive material. Specifically, the optical fiber structure is not woven with a passive material (e.g., cotton, synthetic threads, or any other cloth or thread that does not transmit light). In other words, the optical fiber structure provides structure to the vest (without relying on passive material) defining loops through which a user can place his/her arms.

The enclosure houses control electronics that drive the LED. The electronics can control a pulsing pattern of the LED, a brightness of the LED, a color of the LED (if the LED is able to emit more than one color), etc. To determine the control, signals are passed to the control electronics from one or more various sources including, but not limited to, a light sensor, a wireless device (e.g., smart phone, tablet, computer, etc.), a wired input (e.g., pushbutton, switch, etc.), a heart-rate monitor, a global positioning device, a temperature sensor, etc.

For example, a group of fourteen players meet up to play a game of Ultimate (also called Ultimate Flying Disc). Each player is assigned to one of two teams and has an illuminated vest as described herein. The players for one of the teams provide an input to their vests such that their vests illuminate a red color, and the players for the other team provide an input to their vests such that their vests illuminate a blue color. After playing for a while, when the sun starts going down, a light sensor on the vests may instruct the vests to dim.

In some instances, at least one of the embodiments of the illuminated vest, as described herein, is part of a system that further includes a zone marker. The zone marker wirelessly communicates with the vests (directly or indirectly) to provide information to control the LED. Continuing with the example above, zone markers may be used to define a field of play and two end zones. When in the field of play, the zone markers may not indicate a change to the vests. However, if a player steps out of bounds, then one or more zone markers may instruct the control electronics to pulse that player's LED. Also, the zone markers indicating the red team's end zone may turn a blue player's vest to yellow when that player is in the red end zone.

Figure 1:
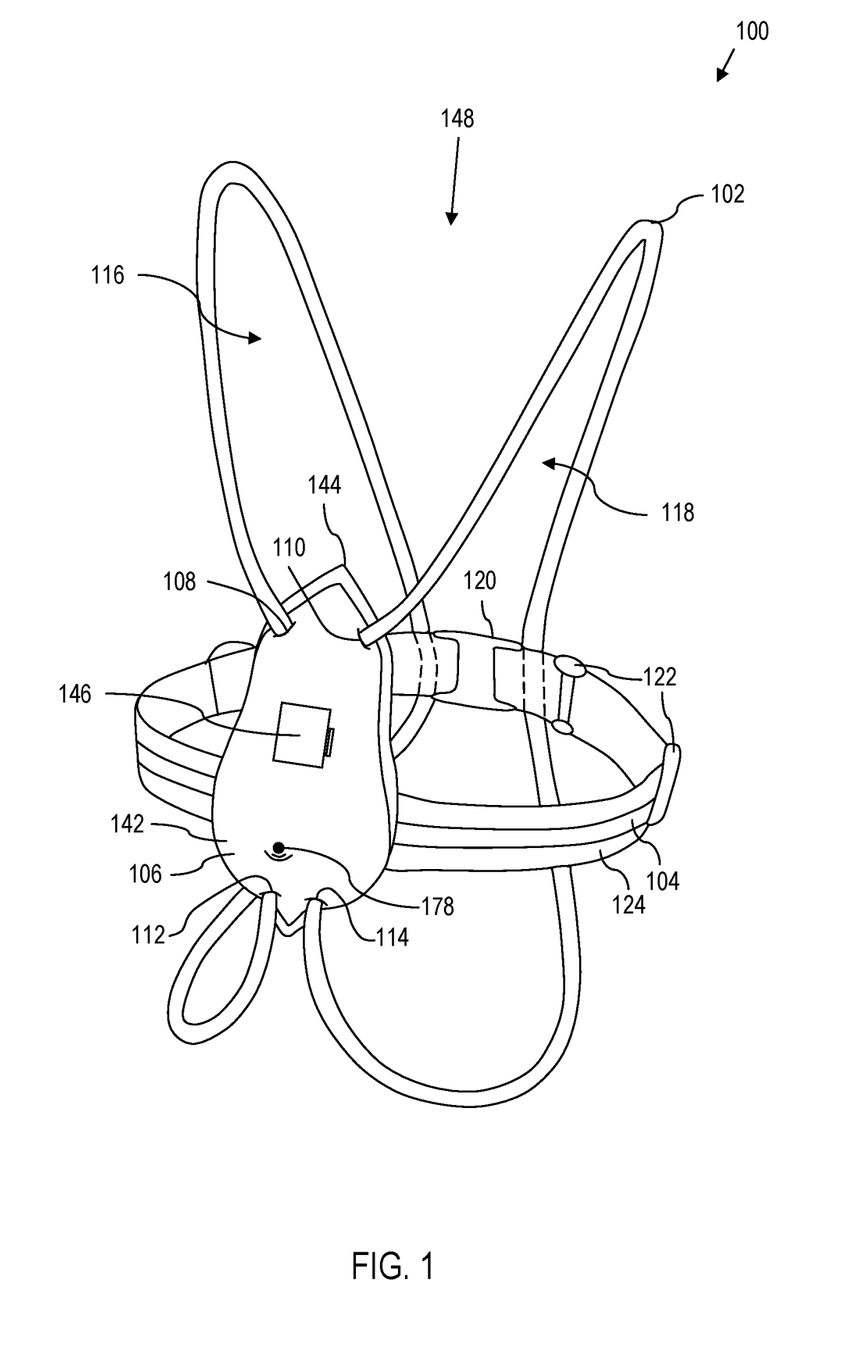
FIG. 1 is an illustration of an illuminated vest including a belt, an enclosure, and an optical fiber structure that is independent of passive material, according to various aspects of the present disclosure.
Figure 2:
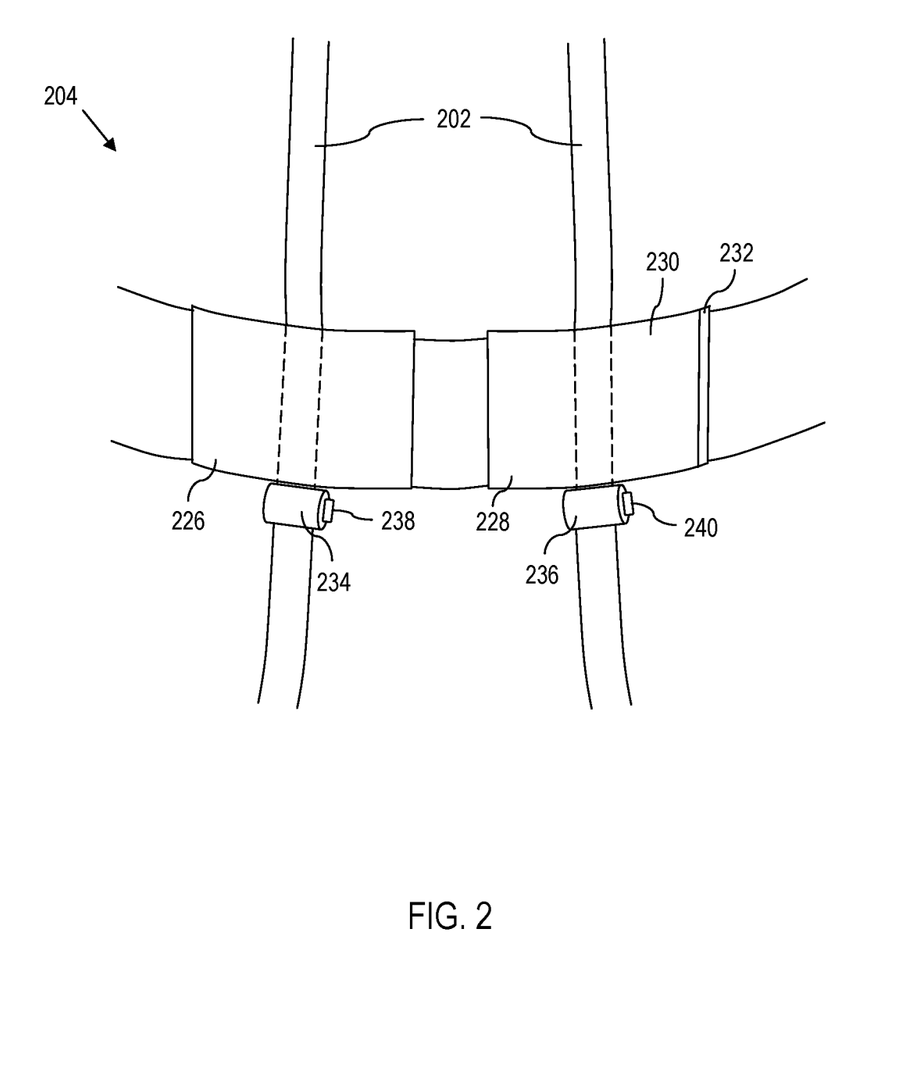
FIG. 2 is an illustration of the belt of the illuminated vest of FIG. 1 illustrating positioners and cord locks, according to various aspects of the present disclosure.
Figure 3:
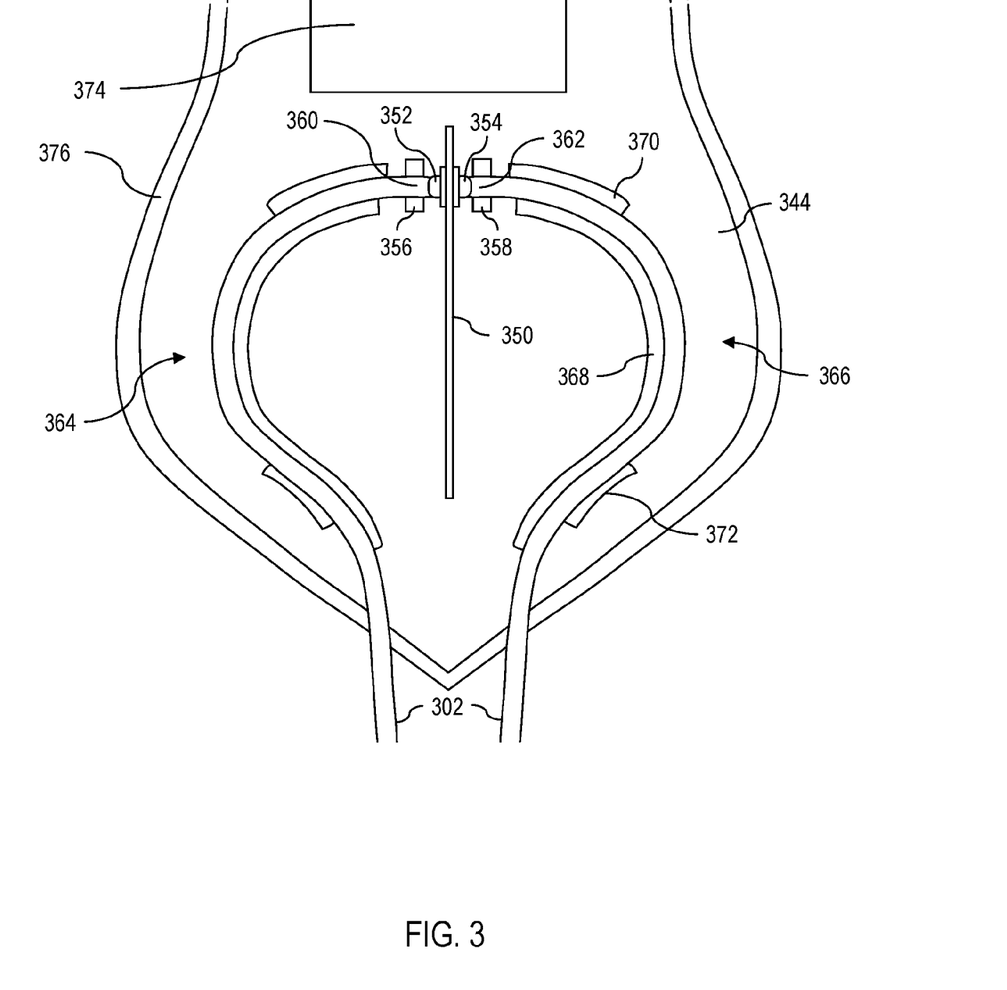
FIG. 3 is an illustration of the enclosure of the illuminated vest of FIG. 1 illustrating a curved channel within the enclosure, according to various aspects of the present disclosure.

Turning now to the figures (in FIGS. 1-3, similar numbers (e.g., 102, 202, 302) denote similar components (e.g., optical fiber structure)) and in particular to FIG. 1, a rear view of an illuminated vest 100 according to various aspects of the present disclosure is shown. The illuminated vest 100 includes an optical fiber structure 102, a belt 104, and an enclosure 106. The optical fiber structure 102 is independent of passive material. In other words, the optical fiber structure 102 is not woven with passive material such as cotton, polyester, etc. For example, the optical fiber structure 102 can be a single optical fiber, unwoven with anything else, as shown in FIG. 1. The single optical fiber 102 passes through the enclosure 106 via two holes 108, 110 in the enclosure, which anchors the optical fiber structure 102, while ends of the optical fiber 102 enter the enclosure through two other holes 112, 114. The ends of the optical fiber 102 are described in greater detail below in reference to FIG. 3. Further, the interaction of the optical fiber 102 with the enclosure 106 creates two loops 116, 118 through which a user can put a limb (e.g., an arm) to don the vest 100, with the enclosure 106 resting on the user's back. The belt 104 secures the vest 100 to the user, as will be discussed in greater detail below.

As opposed to the single, unwoven optical fiber structure, the optical fiber structure 102 may be a single optical fiber woven amongst itself. For example, the single optical fiber may be braided, woven, twisted, or a combination thereof back on itself to provide a thicker band of illumination. Alternatively, the optical fiber structure 102 may be a plurality of unwoven optical fibers. As another alternative, the optical fiber structure 102 may be a plurality of optical fibers that are woven together. Regardless of the composition of the optical fiber structure 102, the optical fiber structure is independent of passive material.

Moreover, the optical fiber structure 102 may comprise any suitable optical fiber. For example, the optical fiber may include a Teflon® (Teflon trademark registered to E. I. Du Pont de Nemours and Company of 1007 Market Street in Wilmington, Del. 19898) coating or any other synthetic resinous fluorine-containing polymer coating. Further, the optical fiber structure 102 may comprise one or many optical fibers or thermoplastic panels that have been abrased so to emit light uniformly along the surface. Moreover, an optical fiber with a small bend radius (e.g., 5-7 millimeters) with little loss is preferred, although not required, such as ClearCurve® optical fiber (ClearCurve trademark registered to Corning Incorporated of One Riverfront Plaza in Corning, N.Y. 14831). Moreover, the optical fiber structure 102 may include a high-gloss coating.

The belt 104 wraps around a body part of the user. For instance, the belt can wrap around the user's waist, other parts of the user's abdomen, neck, head, limb, etc. Further, the belt 104 can include fasteners 120, slides 122, glides, rings, hooks, etc., which allow the belt 104 to be adjusted to fit different sized users. While most of the users described herein are human users, the belt 104 may be adjusted such that the vest 100 can be used by a dog, cat, horse, etc. In the cases where the user is a nonhuman, a human should provide the input to control the LEDs as will be described in greater detail below.

Moreover, the belt 104 may include portions of reflective material 124 to enhance illumination properties of the vest 100 while the vest is illuminated or while there is an external light (e.g., the sun, headlights from a passing car, streetlight, overhead light, etc.) shining on the vest 100.

Turning briefly to FIG. 2, closer detail of an embodiment of the belt 104 of FIG. 1 is shown. The belt 204 includes two positioners 226, 228 through which the optical fiber structure 202 runs. These positioners 226, 228 open and close to allow the optical fiber structure 202 to be removed or placed in the positioners 226, 228. As such, the optical fiber structure 202 is not woven into the belt 204, but the positioners 226, 228 allow the optical fiber structure intersecting the belt 204 to remain generally orthogonal to the belt 204. The positioners 226, 228 prevent the optical fiber structure 202 from moving parallel to the belt (i.e., lengthwise along the belt) to prevent the optical fiber structure 204 from interfering with the user when the vest is in use.

As shown, the positioners 226, 228 each comprise a hook 230 and loop 232 fastener. However, any other type of fastener that restricts movement of the optical fiber structure 202 parallel to the belt 204 may be used. While the positioners 226, 228 are shown on the inside of the belt 204 in FIG. 2, the positioners 226, 228 may be on the outside of the belt 204. Further, the positioners 226, 228 are shown on the opposite side of the belt 204 as the enclosure (not shown); however, the positioners 226, 228 may be on the same side of the belt 204 as the enclosure.

FIG. 2 further illustrates two cord locks 234, 236 coupled to the optical fiber structure 202. The cord locks 234, 236 prevent the optical fiber structure 202 from moving lengthwise along the fiber optical structure 202. As such, the cord locks 234, 236 are used to fix a length of the fiber optic structure 202 between the enclosure (106, FIG. 1) and the belt 204 or a length of the fiber optic structure 202 between the two cord locks 234, 236. As shown, the cord locks 234, 236 each have a pushbutton 238, 240 that releases friction between the cord lock 234, 236 and the optical fiber structure 202. Then, the cord lock 234, 236 can slide up and down the optical fiber structure 202. When the pushbutton 238, 240 is released, the cord lock 234, 236 reapplies a frictional force on the optical fiber structure 202 to remain in place. Alternatively, the cord locks 234, 236 may not include a pushbutton and rely on differences between static friction and dynamic friction to allow the user to move the cord lock 234, 236, to keep the cord lock 234, 236 in place, or both. In any case, the force applied to the optical fiber structure 202 should not be enough to pinch the optical fiber structure 202 and overly prohibit light transmission throughout the optical fiber structure 202.

While shown with two cord locks 234, 236, the illuminated vest 200 can have any number of cord locks (e.g., only one total; one on each side of the belt for both portions of the optical fiber structure 202 intersecting the belt 204 for a total of four; etc.). Further, the cord locks 234, 236 may be separate from the belt 204 as shown in FIG. 2 or they can be integrated with the belt 202, including the positioners 226, 228 of the belt 204. Moreover, while the vest 200 of FIG. 2 is shown with both positioners 226, 228 and cord locks 234, 236, embodiments of the vest may lack positioners, cord locks, or both.

The cord locks 234, 236 allow a user to adjust the size of the vest (100, FIG. 1). Thus, with the adjustability of the belt 204 and the cord locks 234, 236, the vest may be sized to comfortably fit over a shirt, a bulky jacket, or directly on a shirtless man. Thus, the optical fiber structure (102, FIG. 1) provides structure for the vest. Therefore, no other structure such as a shirt or vest is required to maintain the illuminated vest (100, FIG. 1) on the user.

Returning to FIG. 1, an exemplary embodiment of the enclosure 106 is shown. The exemplary enclosure 104 includes a shell 142 coupled to a base 144. The shell 142 includes a battery door 146, which allows the user to change batteries when the batteries are depleted without entirely disconnecting the shell 124 from the base 144. Further, the shell 142 includes the two holes 108, 110 through which a middle portion 148 of the optical fiber structure 102 lies and includes the two holes 112, 114 through which ends of the optical fiber structure 102 pass to reach light emitting diodes within the enclosure 106.

FIG. 3 illustrates a lower portion of the base 344 of the exemplary enclosure 106 of FIG. 1. The base 344 includes control electronics 350 that control operation of two light-emitting diodes (LEDs) 352, 354 as described in greater detail below. Further, the base 344 includes two internal clips 356, 358 that receive opposite ends 360, 362 of the optical fiber structure 302. Moreover, the base 344 includes two channels 364, 366 each comprising an inner wall 368, a top outer wall 370, and a bottom outer wall 372. In some embodiments, the top outer wall 370 and the bottom outer wall 372 are one contiguous wall. The top outer wall 370 and the inner wall 368 work in conjunction to prevent movement of the first end 360 of the optical fiber structure 302 with respect to the internal clip 356.

Also, the bottom outer wall 372 and the inner wall 368 work in conjunction to transform a tensile load applied to the optical fiber structure 302 into a frictional load, which allows the internal clips 356, 358 to apply less force to keep the ends 360, 362 of the optical fiber structure 302 anchored, which reduces any pinching on the optical fiber structure 302 by the internal clips 356, 358. As such, light from the LEDs 352, 354 has less attenuation through the optical fiber structure 302. To aid in the conversion from a tensile load to a frictional load, friction elements may be added to the channels 364, 366.

As shown, the base 306 includes two LEDs 352, 354—one for each end 360, 362 of the optical fiber structure 302. However, there may be only one LED present. Also, in embodiments with an optical fiber structure 302 with a plurality of optical fibers, there may be more than two LEDs in the enclosure 306.

The exemplary base 344 also includes a battery holder 374 and edge binding 376. The edge binding 376 gives a place for fabric to couple to the enclosure 306. For example, the belt (102, FIG. 1) may be coupled to the enclosure 306 through the edge binding 376. In another example, a fabric mesh (not shown) can be attached to the back of the base 344 by sewing the mesh into the edge binding 376, and that fabric mesh allows the enclosure 306 to "breathe" while resting on the user's back by allowing air to flow between the base 344 and the user's back.

Referring back to FIG. 1, the shell 142 may be made of a material that diffuses the light from the LEDs such that the enclosure 106 appears to glow. Alternatively, the shell 142 may be made of an opaque material or a transparent material.

Further, while the enclosure 106 is shown on the back of the illuminated vest 100, the enclosure may be located on the front of the illuminated vest 100 in other embodiments. Regardless of where the enclosure 106 is located on the illuminated vest 100, external light sources (not shown) may be located on the enclosure 106 or belt 104. In several embodiments, the external light sources are mounted on stiff, but flexible, gooseneck structures that allow the user to point the external light source in any direction. For example, if the user wears the illuminated vest 100 to jog at night, then the external light source may be pointed at the path in front of the user to act as a sort of headlight. In embodiments with external light sources, the external light source is not optically coupled to the optical fiber structure 102.

Still further, the enclosure may include user input controls 178 such as pushbuttons, switches, sliders, touch screens, etc. Moreover, the enclosure 106 is shown made from a nonmalleable material. However, in some embodiments, the enclosure 106 may be made from a malleable material such as cloth. For example, the enclosure 106 may be a pocket in the belt 104.

Figure 4:
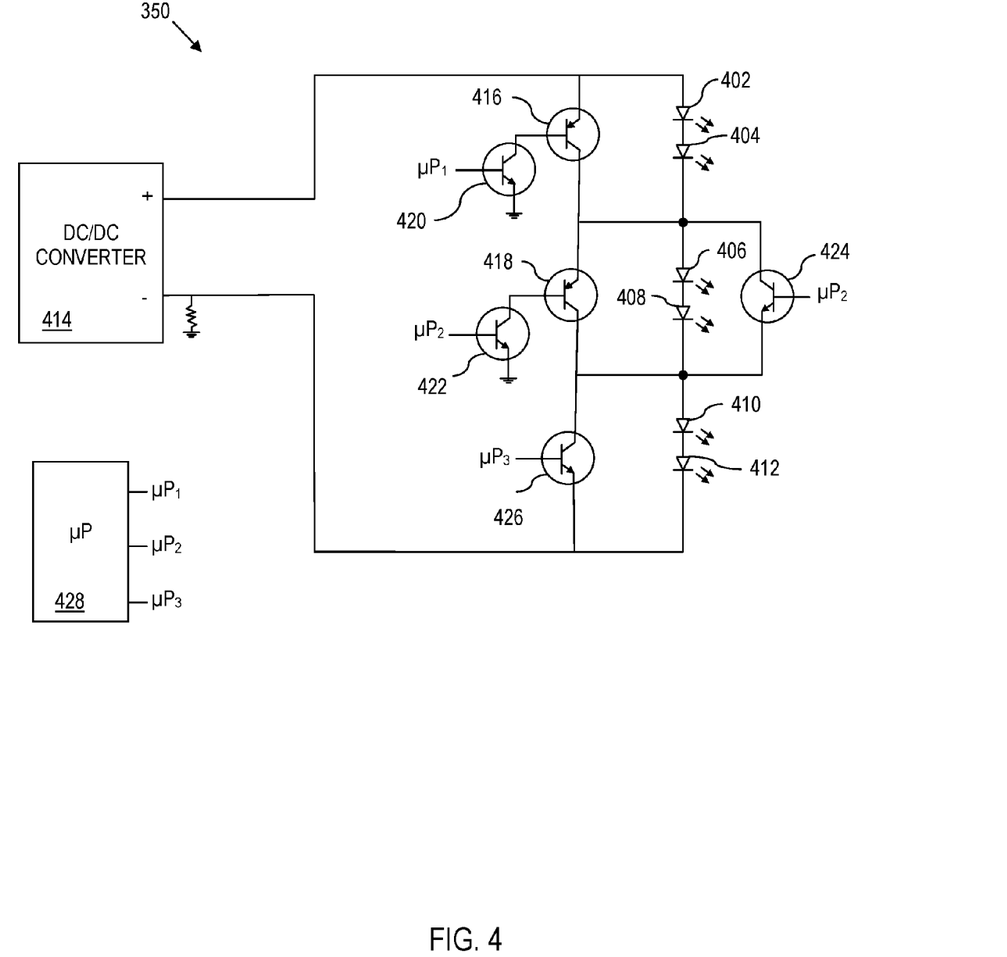
FIG. 4 is a schematic illustrating a light-source driver of control electronics for controlling light emitting diodes in an illuminated vest, according to various aspects of the present disclosure.

FIG. 4 illustrates a light-source driver of exemplary control logic 350 used to drive the LEDs (352, 354, FIG. 3). In various embodiments, the LEDs are multi-colored LEDs. For example, the LEDs may each have three internal light-emitting diodes colored blue 402, 404, green 406, 408, and red 410, 412. Depending on which internal LEDs 402, 404, 406, 408, 410, 412 are active, the emitted color of the multi-colored LEDs (352, 354, FIG. 3) will vary.

In the exemplary configuration of FIG. 4, the internal LEDs 402, 404, 406, 408, 410, 412 are configured in series between voltage differentials of a DC-DC converter 414 with several PNP transistors 416, 418 and NPN transistors 420, 422, 424, 426 used to activate or deactivate the internal LEDs. Control signals $\mu P_1$, $\mu P_2$, $\mu P_3$ from a processor 428 ultimately control the bases of the transistors 416, 418, 420, 422, 424, 426.

A combination of the first PNP transistor 416 and the first NPN transistor 420 is connected in parallel with the blue internal LEDs 402, 404. Specifically, the base of the first NPN transistor 420 is coupled to control signal $\mu P_1$, the emitter is coupled to ground, and the collector is coupled to the base of the first PNP transistor 416. The emitter of the first PNP transistor 416 is coupled to the p-type node of the first blue internal LED 402, and the collector of the first PNP transistor 416 is coupled to the n-type node of the last blue internal LED in series (in the exemplary case of two multi-colored LEDs, blue internal LED 404 is the last in the blue series; in the case of only one multi-colored LED, blue internal LED 402 would be the last in the blue series).

A combination of the second PNP transistor 418 and the second and third NPN transistors 422, 424 is connected in parallel with the green internal LEDs 406, 408. Specifically, the base of the second NPN transistor 422 is coupled to control signal $\mu P_2$, the emitter is coupled to ground, and the collector is coupled to the base of the second PNP transistor 418. The emitter of the second PNP transistor 418 is coupled to the p-type node of the first green internal LED 406, and the collector of the second PNP transistor 418 is coupled to the n-type node of the last green internal LED in series (in the exemplary case of two multi-colored LEDs, green internal LED 408 is the last in the green series; in the case of only one multi-colored LED, green internal LED 406 would be the last in the green series). Further, the base of the third NPN transistor 424 is also coupled to control signal the collector is coupled to the p-type node of the first green internal LED 406, and the emitter is coupled to the n-type node of the last green internal LED in series.

The fourth NPN transistor 426 is connected in parallel with the red internal LEDs 410, 412. Specifically, the base of the fourth NPN transistor 426 is coupled to control signal $\mu P_3$, the collector is coupled to the p-type node of the first red internal LED 410, and the emitter is coupled to the n-type node of the last red internal LED in series (in the exemplary case of two multi-colored LEDs, red internal LED 412 is the last in the red series; in the case of only one multi-colored LED, red internal LED 410 would be the last in the red series).

In some cases, the DC/DC converter 414 is a current regulator. In operation, when the transistor 416, 418, 424, 426 across a color-series of LEDs (e.g., 402 and 404, 406 and 408, 410 and 412) is active, then the LEDs within that color-series are bypassed and thus not activated. Thus, the control signals $\mu P_1$, $\mu P_2$, $\mu P_3$ from the processor 428 determine which color-series is active to control the color of the light emitted from the vest.

However, when all of the LEDs are determined to be off (e.g., while pulsing the LEDs, deactivating the lights, etc.) then the DC/DC converter 414 is shut down so there is no current being wasted through all of the transistors. Further, even when the DC/DC converter is deactivated, the transistors are not all activated, which prevents a short from input voltage to ground.

The DC/DC converter 414 supplies a constant current despite how many LEDs are active (except when all LEDs are not active as discussed above) at any given time. That constant current results in a constant brightness of the LEDs. Thus, if the forward voltage required for the green and blue LEDs is 3 volts and the forward voltage for the red LEDs is 2 volts, then in the configuration of FIG. 4, 16 volts are needed to drive all of the LEDs at the same time. However, if only the red LEDs 410, 412 are activated, then only 4 volts are required to drive the circuit (note that the current remains the same).

The voltage levels of the control signals $\mu P_1$, $\mu P_2$, $\mu P_3$ from the processor 428 are dependent on the voltage of the processor (e.g., approx. 1.5-4.5 volts). However, as mentioned above, the voltage supplied by the DC/DC converter 414 could be up to 16 volts. In order to activate an NPN transistor, the voltage at the base must be higher than the voltage at the emitter; thus, the 4.5-V signal will not activate a PNP transistor that has 10 volts at its emitter (if both the green LEDs 406, 408 and the red LEDs 410, 412 are active). Therefore, the PNP transistor 416 is used to bypass the blue LEDs 402, 404. However, the NPN transistor 420 is used to invert the control signal $\mu P_1$ for the base of the PNP transistor 416 (PNP transistors activate when the base voltage is lower than the emitter. Thus, the blue LEDs 402, 404 can be activated or bypassed based on a signal less than the emitter voltage (e.g., control signals less than emitter voltage).

The combination of transistors 418 and 422 function in a similar way as the transistors mentioned above. However, when transistor 426 is active and the red LEDs 410, 412 are bypassed, transistor 418 may go into a metastable state or into a linear region yet still ineffective at bypassing the green LEDs 406, 408. Therefore, transistor 424 is used in such a situation. However, transistor 424 alone is not enough, because if the red LEDs 410, 412 are not bypassed, then the situation similar to the situation of the blue LEDs 402, 404 described above may occur. Thus, both bypass techniques are used.

With the particular transistor scheme described herein, only one DC/DC converter is needed to drive all six LEDs.

As mentioned above, the DC/DC converter 414 supplies a constant current to drive the LEDs. However, if dimming is desired, the enable signal of the DC/DC converter 414 or the transistors can be pulse-width modulated to effectively produce light over time.

The configuration of FIG. 4 is exemplary; other configurations may be used. For example, each color series may have its own DC/DC converter. Also, switches (e.g., transistors) may be coupled to the entire series or individual-color series in series. Further, internal LEDs of the same color do not need to be in series, controlled by the same control logic. For example the green internal LED 416 of the first LED (352, FIG. 3) may be active while the green internal LED 418 of the second LED (354, FIG. 3) is not active.

Figure 5:
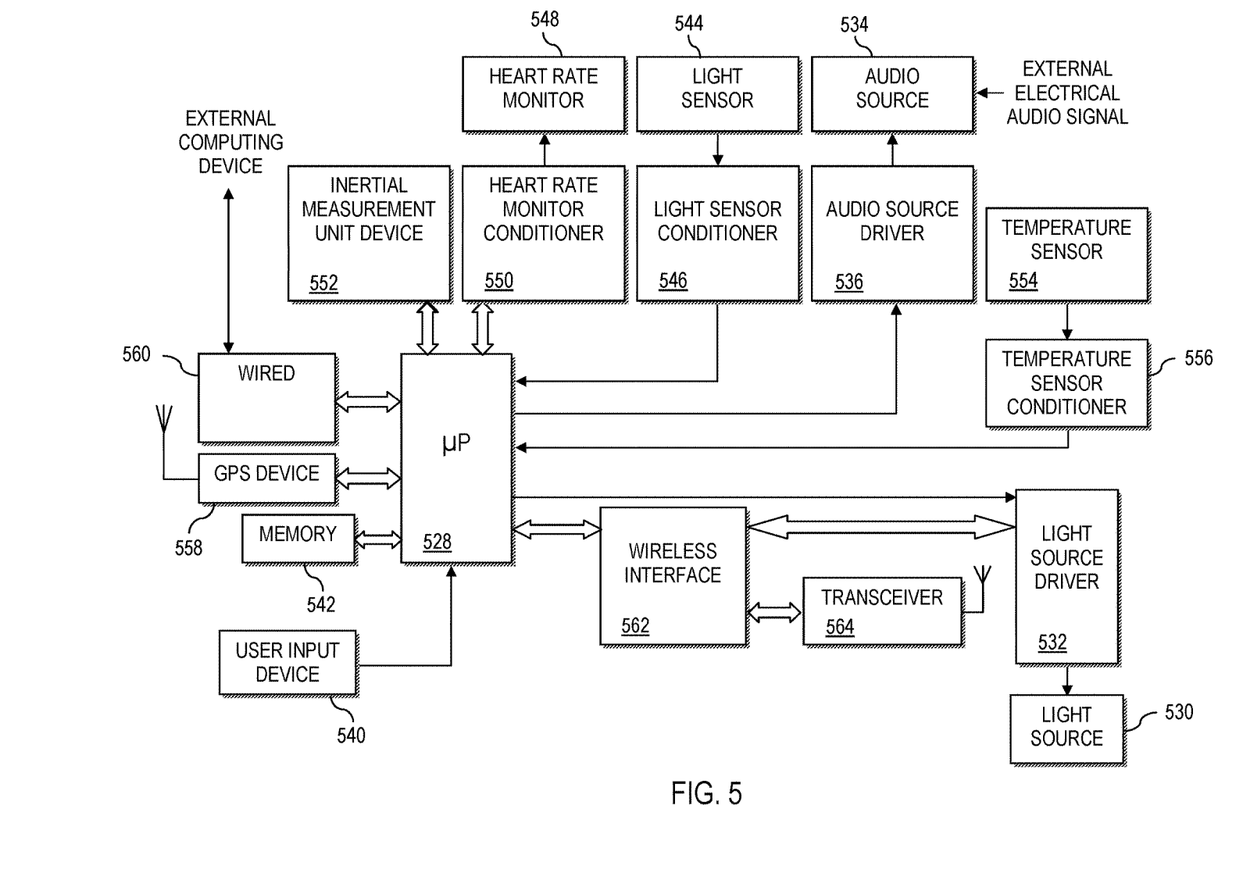
FIG. 5 is a block diagram illustrating control electronics of an illuminated vest, according to various aspects of the present disclosure.

FIG. 5 is a block diagram illustrating more of the control logic (350, FIG. 3), which controls the illumination color, brightness (e.g., using pulse-width modulation), flashing pattern, etc. of a light source 530 (e.g., LEDs 352, 354, FIG. 3). The processor 528 sends and receives signals from various components in the control logic. In particular, the processor 528 sends signal to a light source driver 532 (e.g., the light-source driver of FIG. 4) to control the light source 530. The light source driver 532 may have a different configuration than the exemplary configuration of FIG. 4 if desired. All of the other components (i.e., components that are not the processor 528, light source 530, or the light-source driver 532) described in FIG. 5 are optional.

The processor 528 may control an audio source 534 directly or through an audio source driver 536. The audio source 534 may be an electroacoustic transducer that produces sound in response to an electrical audio input signal. For example, the audio source 534 may be a speaker or a piezoelectric transducer. Further, the audio source 534 may be a single audio source or several audio sources (e.g., two waterproof speakers). Alternatively or in conjunction, the audio source 534 may be driven, directly or through the audio source-driver 536, by an external electrical audio signal. For example, the user may want to listen to music while wearing the vest, so the user hooks up a stereo music player (e.g., an MP3 player) to the audio source 534. In embodiments with both processer 528 control and external control of the audio source 534, a user may have control over whether the processor 528 has priority over the external signal to the audio source. For example, if music is playing from an external source and the processor 528 sends a beep to indicate some sort of event, the music may cut out to allow the beep to be played on its own, the beep may be played over the music, or the beep may be suppressed so the music is not interrupted.

In cases with the external signal, the processor 528 may sense a beat of music supplied and control the light-source driver 532 to pulse to the rhythm of the music.

The audio-source driver 536 amplifies and possibly conditions signals from the processor 528, the external signal, or both to the audio source 534. However, if the audio-source driver 536 is present, signals from the processor 528 and the external signal are not required to use the audio-source driver 536. For example, as shown in FIG. 5, the signal from the processor 528 uses the audio-source driver 536 while the external signal does not. Further, the audio-source driver 536 should be impedance matched to the audio source 534; however, such impedance matching is not required.

Any method of amplifying the signal, conditioning the signal, or both may be used. For example, the processor 528 can send an analog signal to the audio-source driver 536, which then switches a voltage across the audio source 534 using a field-effect transistor (e.g., metal-oxide semiconductor field effect transistor (MOSFET), junction-gate field-effect transistor (JFET), etc.) using pulse-width modulation.

The control electronics 500 may also include a user input device 540 that allows a user to control aspects of the vest. As such, the user input device 540 may be a pushbutton, switch, dial, key, touchpad, E-field sensor, capacitance sensor, or other tactile sensor. In some embodiments, the processor 528 can perform debouncing, conditioning, or both on signals from the user input device 540.

A memory 542 provides data storage capability to the processor 528. The memory 542 may be volatile or non-volatile and solid-state or mechanical. However, in preferred embodiments, the memory 542 is a nonvolatile, solid-state memory. As such, the memory 542 may be used to restore various components to a last-known state when power is removed and applied to the vest. Further, the memory 542 may be used to store data (including a time stamp) from various components for later download. Moreover, the memory 542 can store audio for playback on the audio source 534.

A light sensor 544 detects light and provides a signal that varies with a change in light to the processor 528 directly or through a light-sensor conditioner 546. Thus, the processor 528 has an indication of the ambient light and can use that indication to control the light-source driver 532 accordingly.

For example, when the sun is setting, the light sensor 544 may detect that ambient light is fading. As such, the processor 528 can instruct the light-source driver to dim the light source 530 to conserve power, because less light is needed in lower-light situations. As another example, if a user is wearing the vest while jogging and the light source 530 is not activated because there is sufficient ambient light to see the jogger, then if the ambient light dims (e.g., the sun starts to set), the light sensor 544 detects the change and instructs the processor 528 to produce light (or to increase the light) so the user can be seen more easily. As yet another example, if the light sensor 544 detects a sudden change in ambient light, then that may indicate that a car with its headlights on is approaching. In response, the processor 528 may instruct the light-source driver 532 to change colors and flash brightly to warn the driver of the car that the user of the vest is nearby. Further, the processor 528 may control the audio-source driver 536 based on the light sensor 544.

The light sensor 544 may be any type of light sensing device such as, but not limited to: photoelectric, photovoltaic, photoconductive, photojunction, or combinations thereof. Moreover, there may be several light sensors 544 (e.g., on the back, front, sides, etc. of the vest) to detect light from different directions.

A heart-rate monitor 548 provides an indication of the user's heart rate to the processor 528 directly or through a heart-rate-monitor conditioner 550. Basically, an electrode attaches to the user's skin to produce information about the user's heartbeat. The processor 528 may then store the heart-rate information in the memory 542. Further, the processor 528 may use the heart-rate information to pulse the light source, audio source, or both in rhythm with the user's heartbeat. The user can then adjust the workout to reach an optimal heart rate. For example, if a user's optimal heart rate is 160 beats per minute (bpm). If the heart-rate monitor 548 indicates that the current heart rate of the user is 120 bpm, then the processor 528 may control the light source 530 to emit a green light and flash at 120 bpm. However, if the heart-rate monitor 548 indicates that the current heart rate of the user is 180 bpm, then the processor 528 may control the light source 530 to emit a red light and flash at 180 bpm. Thus, the user can adjust the workout to achieve an optimal heart rate.

An inertial-measurement unit 552 provides information to the processor 528 directly or through a conditioner (not shown). Basically, the inertial-measurement unit 552 includes accelerometers, gyroscopes, or both that provide information about the user's footfall cadence, speed, distance traveled, changes in direction, or combinations thereof. The processor 528 can store that information (time-stamped or not) in the memory 542. Further, the processor 528 can use the information to control the light source 530, audio source 534, or both. For example, if the inertial-measurement unit 552 indicates that a user's cadence is too slow, the processor 528 can indicate that the user run faster by changing the color emitted from the light source 530. Further, if the user programs a desire to run five kilometers (5 k), then the processor 528 can control the light source 530 to get brighter throughout the run until 5 k is met, then the light source may flash 530.

A temperature sensor 554 may indicate a user's core temperature, ambient temperature, or both to the processor 528 directly or through a temperature-sensor conditioner 556. The processor 528 can then store the temperature information, use the information to control the light source 530, audio source 534, or both. Also, global positioning information may be supplied through a global position system device 558.

Further, the sensors 540, 544, 548, 552, 554, 558 described herein may be used in conjunction to control the light source 530, the audio source 534, or both. For example, a user can set an optimal heart rate and then start a run. The heart-rate monitor 548 indicates that a heart rate is too slow at the current cadence detected by the inertial-measurement unit 552. Therefore, the processor 528 may flash the light source 530 at a rate equal to a cadence that the user should run to achieve the set heart rate.

The processor 528 can communicate to the outside world through a wired interface 560, a wireless interface 562 and a transceiver 564, or both. The wired interface 560 can be any interface to any wired form of communication: analog signals, digital signals, full-duplex operation, half-duplex operation, or reasonable combinations thereof. For example, the wired interface can be a universal serial bus (USB) interface, which can be used to transfer information between the processor 528 and an external computer (e.g., desktop, laptop, MP3 player, etc.).

The wireless interface 562 uses the transceiver (i.e., TX/RX device) 564 to communicate wirelessly with other devices. The transceiver 564 can communicate through radio frequency (RF), infrared (IR), modulated laser, visible light, high frequency audio, ultrasound, microwave, etc., or combinations thereof. Further, the communications can be 1-way, 2-way, half-duplex, full-duplex, etc. or reasonable combinations thereof. For example, an RF-based transceiver 564 can use WiFi (wireless fidelity), WLAN (wireless local area network), ZigBee, Bluetooth, proprietary protocols, etc.

Through the wireless interface 562, the processor 528 of the vest can communicate with any other device that may be on a wireless network with the wireless interface 562. For example, the processor can communicate with a cell phone, laptop, tablet, specialized devices, etc. over the wireless network. As such, user can use a cell phone to instruct the processor 528 to change a color, pattern, brightness, etc. of the light source 530.

Figure 6:
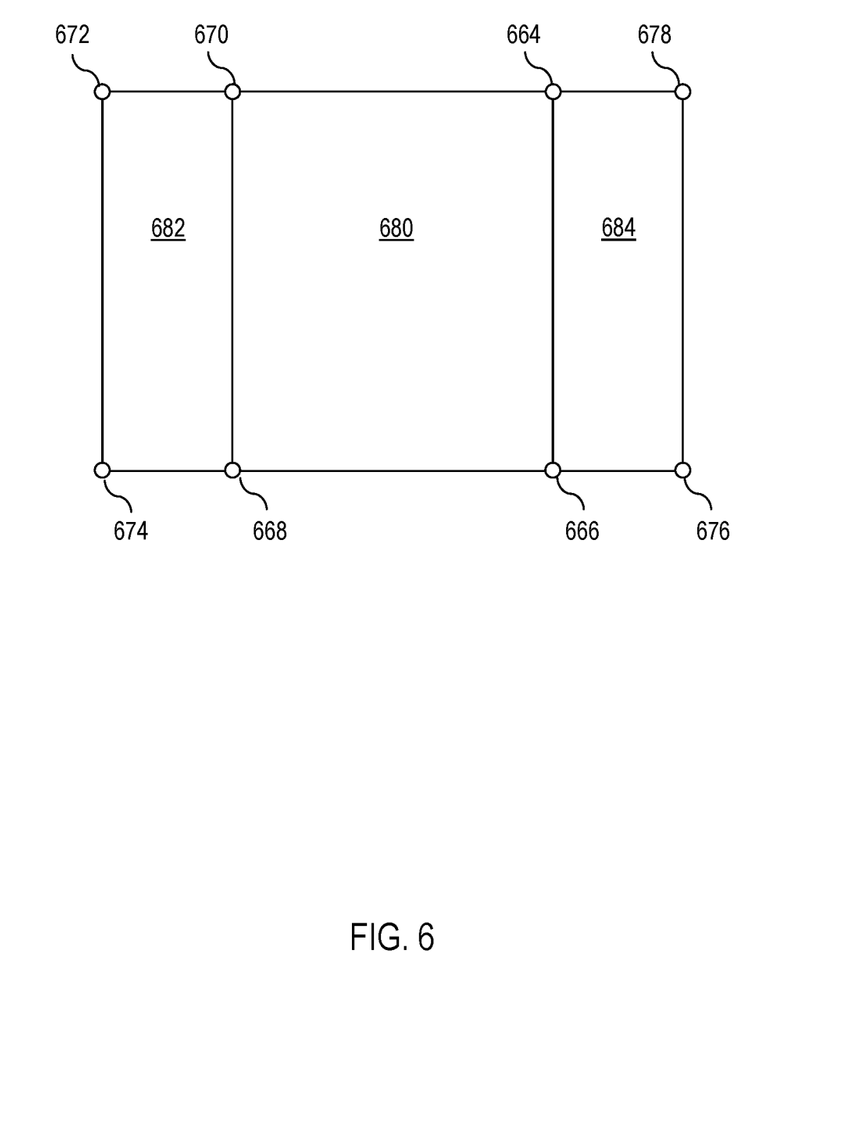
FIG. 6 is an illustration showing a field for a game divided into zones using zone markers, according to various aspects of the present invention.

Further, the processor 528 may communicate with processors of other vests via the wireless network. As such, the vests can be used to relay information from one point to another point. For example, if a user is using a USB interface from a laptop to set information for a first vest, then that information or other information can be sent to other vests wirelessly by the first vest. As another example, if a user needs to configure a first vest, but the first vest is out of range of the wireless range of a tablet that the user is using to configure the first vest, then the configuration information can be sent to the first vest through a second vest that is in range of the tablet and the first vest. Thus, the network can be: extended or distributed star with broadcast multi-access or non-broadcast multi-access, ring, fully connected mesh, partially connected mesh, tree, daisy chain, line, point-to-point, or combinations thereof An example of a specialized wireless device is shown in FIG. 6. Zone markers 664, 666, 668, 670, 672, 674, 676, 678 can be placed at certain points on a playing field to indicate different zones 680, 682, 684. As shown in FIG. 6, three zones 680, 682, 684 are created using the zone markers 664, 666, 668, 670, 672, 674, 676, 678. Specifically, a playing field zone 680 is created using four zone markers 664, 666, 668, 670. A first end zone 682 is created using markers 668, 670, 672, and 674, and a second end zone 684 is created using markers 664, 666, 676, and 678.

The zone markers 664, 666, 668, 670, 672, 674, 676, 678 include local position system beacons which wirelessly communicate with the vest to determine a position of the vest relative to the zones 680, 682, 684 using triangulation, trilateration, multitrilateration, or combinations thereof. For example, if the processor 528 uses some of the zone markers to use triangulation to determine that a vest is within the first end zone 682, then the processor 528 can change a flashing pattern of the vest. As another example, if the processor 528 uses some of the zone markers to use trilateration to determine that a vest has gone out of bounds.

As shown in FIG. 6, the zone markers are on the corners of the zones. However, the zone markers may be placed outside the field, inside the field, or both depending on the method used for resolving the location of the vest. For example, the zone markers may be staggered randomly, in a pattern, or both throughout the field, end zones, and out of bounds. Further, there may be more or less than the eight zone markers shown in FIG. 6.

Another example of a specialized device is a disc used in the game of Ultimate. The specialized disc can include a local position system device as described above. Further, the disc may also include a processor, light source, and light source driver of its own. Thus, the disc can be illuminated in much the same way an illuminated vest as described herein can be illuminated. Other specialized devices include other game pieces (e.g., football, basketball, hoop, etc.). Further, the vest itself may be regarded as a specialized device that can communicate with other vests.

The electronic components described herein receive power from a system power supply. Any type of power converter and power source may be used. For example, the power source may be a lithium-ion battery or an AA dry-cell battery. Further, the system power supply may include an energy storage device other than a battery (e.g., super capacitor, potential, chemical, gravitational, magnetic, dielectric, spring, compressed fluid, compressed gas, etc.). In embodiments with a rechargeable battery, the vest may include a battery charging device.

Further, the system power supply may include an energy harvesting device that harvests energy from one or more sources and stores that energy in the energy storage device. The types of energy that may be harvested include, but are not limited to: solar power, thermal power, wind energy, salinity gradients, and kinetic energy sources. For example, an inertial converter may be used to harvest kinetic energy from the user while the user plays a sport or runs cross-country. In a case where the user's activity has a repeatable cadence (e.g., running cross-country), the vest may include a resonant inertial converter that is set to the user's cadence (e.g., 3 Hz (i.e., 180 steps per second)).

Another example of an energy harvesting device is a thermal-electric transducer, which generates energy when the user's temperature is significantly different than the ambient temperature. Such energy harvesting devices described above increase a lifespan of the power source.

The illuminated vest and other devices described herein provide distinction and safety to users in various ways. For example, the illuminated vest can be used to differentiate teams during a sporting event. The optical fiber structure is adjustable using the cord locks, so the vest can fit almost any person. Further, the optical fiber structure is independent of any passive material. In other words the optical fiber structure provides structure for the vest by making the limb loops through which a user may place his or her arms. Also, because the optical fiber structure is independent of passive material and adjustable, the vest can be worn over a T-shirt, a bulky winter jacket, or over the user's skin directly, which offers comfortable use in many different temperatures and situations.

The light-source drivers described herein offer configurations to drive multicolored LEDs from only one DC/DC converter (LED driver) or driver, unlike previous implementations that may require one LED driver for each internal LED of a multicolored LED to ensure proper functionality.

The addition of other devices such as zone markers or game pieces that communicate with the illuminated vest ultimately to control the LEDs allows the vest to be used in many types of sporting events, including those that may take place in low-light or no light situations. For example, if a game of Ultimate Disc starts an hour before sunset and lasts until after dark, the game will not need to be called off on account of darkness. Instead, the players may continue to play in the low-light conditions, with the illuminated vests adjusting to the lower light by lowering the brightness of the optical fiber structure for example. Further, the illuminated vests allow players to distinguish teams.

In some instances, a user can program a game change into a game. For example, if two teams playing a game seem uneven, a user can switch two players by changing the color emitted from the LEDs of the vests. As another change, a user can program a change in the rules or teams to occur at a certain time of a game just to keep the players on their toes. Thus, the vests can communicate between themselves and the other devices to provide a more pleasant/diverse sporting experience.

Moreover, the vest provides safety for runners, joggers, bikers, etc. at night. The illuminated vest indicates to others that a user is nearby.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage media having computer readable program code embodied thereon. A processor may be a controller, processor, digital signal processor (DSP), field-programmable gate array (FPGA), complex programmable logic device (CPLD), or combinations thereof. Further, the processor may be a single processor or multiple processors and may be analog, digital, or mixed signal.

Any combination of one or more computer readable media may be utilized. The computer readable medium may be a computer readable signal medium or a computer readable storage medium. A computer readable storage medium may be, for example, but not limited to, an electronic system, apparatus, or device; a magnetic system, apparatus, or device; an optical system, apparatus, or device; an electromagnetic system, apparatus, or device; an infrared system, apparatus, or device; a semiconductor system, apparatus, or device; or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Further, in the context of this document, a computer readable storage medium specifically does not include signals (e.g., carrier waves).

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A device comprising:
    an enclosure including:
        a light-emitting diode; and
        control electronics that control the light emitting diode;
    a belt physically coupled to the enclosure, the belt comprising passive material; and
    an optical fiber structure, independent of passive material, formed to create a limb loop;
    wherein:
        the optical fiber structure is a single optical fiber that includes a first end and a second end, wherein the first end of the single optical fiber couples with the enclosure and the second end of the single optical fiber couples with the enclosure;

the light-emitting diode is optically coupled to the first end of the optical fiber structure; and light emitted by the light-emitting diode emits uniformly along a surface of the optical fiber structure.

2. The device of claim 1, wherein the single optical fiber is an unwoven optical fiber.

3. The device of claim 1, wherein the single optical fiber is woven with itself to create the limb loop.

4. The device of claim 1, wherein the belt includes a positioner that prevents the optical fiber structure from sliding lengthwise along the belt, yet allows the optical fiber structure to slide lengthwise along the optical fiber structure.

5. The device of claim 4, wherein the positioner is a hook and loop fastener.

6. The device of claim 4, further including a cord lock coupled to the optical fiber structure, wherein the cord lock is adjustable and prevents the optical fiber structure from sliding in a direction generally lengthwise of the optical fiber structure.

7. The device of claim 1, wherein:
the optical fiber structure includes a middle portion;
the first end is physically coupled to the enclosure;
the second end is physically coupled to the enclosure; and
the middle portion is physically coupled to the enclosure such that the optical fiber structure creates a first limb loop between the first end and the middle portion and creates a second limb loop between the second end and the middle portion.

8. The device of claim 1, wherein the enclosure includes a second light emitting diode optically coupled to the second end of the optical fiber structure.

9. The device of claim 1, wherein the control electronics further include a controller programmed to control a select one of: an emitted color, an emitted brightness, and a strobe pattern of the light-emitting diode.

10. The device of claim 9, wherein the control electronics further include a wireless receiver that communicates with the controller to control the light-emitting diode.

11. The device of claim 1, wherein the control electronics include a light sensor, and the control electronics control the light-emitting diode based on the light sensor.

12. The device of claim 1, wherein the optical fiber structure includes a high-gloss coating.

13. An indication device comprising:
a multi-colored light-emitting diode with three internal light-emitting diodes, each internal light-emitting diode comprising a p-type node, and an n-type node;
a controller including a first output, a second output, and a third output; and
control electronics coupled to the controller and multi-colored light-emitting diode, the control electronics including:
a first PNP transistor including an emitter coupled to the p-type node of the first internal light-emitting diode, a collector coupled to the n-type node of the first internal light-emitting diode, and a base;
a second PNP transistor including an emitter coupled to the p-type node of the second internal light-emitting diode and the collector of the first PNP transistor, a collector coupled to the n-type node of the second internal light-emitting diode, and a base;
a first NPN transistor including an emitter coupled to ground, a collector coupled to the base of the first PNP transistor, and a base coupled to the first output of the controller;
a second NPN transistor including an emitter coupled to ground, a collector coupled to the base of the second PNP transistor, and a base coupled to the second output of the controller;
a third NPN transistor including an emitter coupled to the n-type node of the second internal light-emitting diode, a collector coupled to the p-type node of the second internal light-emitting diode, and a base coupled to the second output of the controller; and
a fourth NPN transistor including an emitter coupled to the n-type node of the third internal light-emitting diode, a collector coupled to the p-type node of the third internal light-emitting diode and the emitter of the third NPN transistor, and a base coupled to the third output of the controller.

* * * * *